United States Patent [19]

Cerny

[11] Patent Number: 5,137,132
[45] Date of Patent: Aug. 11, 1992

[54] ELECTROMAGNETIC CLUTCH WITH IMPROVED ROTOR

[75] Inventor: Zdenek Cerny, Brampton, Canada

[73] Assignee: Tesma International Inc., Concord, Canada

[21] Appl. No.: 682,462

[22] Filed: Apr. 9, 1991

Related U.S. Application Data

[63] Continuation-in-part of Ser. No. 513,630, Apr. 24, 1990, abandoned.

[51] Int. Cl.⁵ ............................................. F16D 27/14
[52] U.S. Cl. ............................. 192/84 C; 192/107 R; 192/107 M; 335/281; 335/296
[58] Field of Search ............... 192/84 C, 84 A, 84 B, 192/84 T, 84 R, 107 R, 107 M; 335/296, 297, 281

[56] References Cited

U.S. PATENT DOCUMENTS

| 2,919,777 | 1/1960 | Walter .................................. 192/84 C |
| 3,082,933 | 3/1963 | Bernard . |
| 3,149,705 | 9/1964 | Shoquist ................................. 192/35 |
| 3,205,989 | 9/1965 | Mantey .................................. 192/84 C |
| 3,384,213 | 5/1968 | Bernard et al. ..................... 192/84 C |
| 3,724,621 | 4/1973 | Heidorn ............................... 192/84 C |
| 4,301,906 | 11/1981 | Shirai .................................. 192/84 C |
| 4,346,616 | 8/1982 | Geisslinger et al. ............... 192/84 C |
| 4,694,945 | 9/1987 | Koitabashi ......................... 192/84 C |
| 4,808,870 | 2/1989 | Gonda ........................... 192/84 C X |
| 4,891,619 | 1/1990 | Booth et al. ......................... 335/296 |
| 4,951,797 | 8/1990 | Booth et al. ....................... 192/107 R |

FOREIGN PATENT DOCUMENTS

| 55-60734 | 5/1980 | Japan .................................. 192/84 R |
| 56-80528 | 7/1981 | Japan .................................. 192/84 C |
| 58-128537 | 8/1983 | Japan .................................. 192/84 C |
| 58-193938 | 11/1983 | Japan .................................. 192/84 C |
| 61-59028 | 3/1986 | Japan .................................. 192/84 C |

*Primary Examiner*—Richard Lorence
*Attorney, Agent, or Firm*—Cushman, Darby & Cushman

[57] ABSTRACT

An electromagnetic clutch comprising a rotor rotatable about a rotational axis, an armature operable to be magnetically coupled with the rotor for rotation therewith, and a fixed annular magnetic coil energizable to magnetially couple the rotor and armature. The rotor includes an inner annular portion, an annular clutch portion extending outwardly from an end of the inner annular portion and an outer annular portion extending from an outer end of the clutch portion. The annular clutch portion includes a coupling surface and a series of arcuate slots extending from the coupling surface through the annular clutch portion. The series of arcuate slots includes (1) a plurality of radially inner annular spaced arcuate slots which extend through the annular clutch portion from a first position at the coupling surface side thereof to a second position at an opposite side thereof in which the second position is disposed radially outwardly of the first position, and (2) a plurality of radially outer annularly spaced arcuate slots which extend in one direction inwardly from the couplingn surface side of the annular clutch portion at a first position and extend outwardly to an opposite side of the annular clutch portion in a different direction at a second position spaced radially inwardly of the first position.

20 Claims, 4 Drawing Sheets

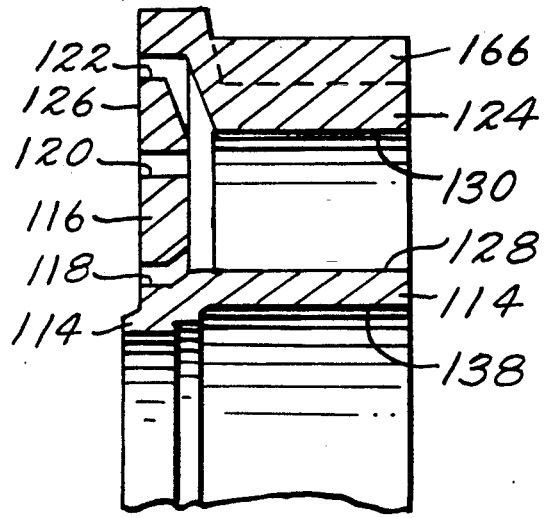
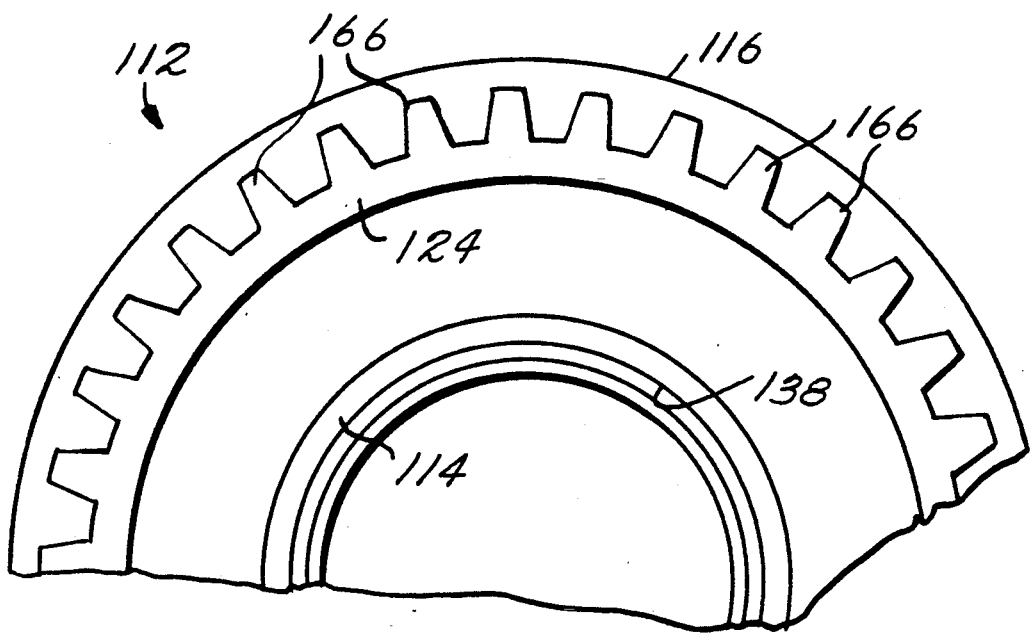

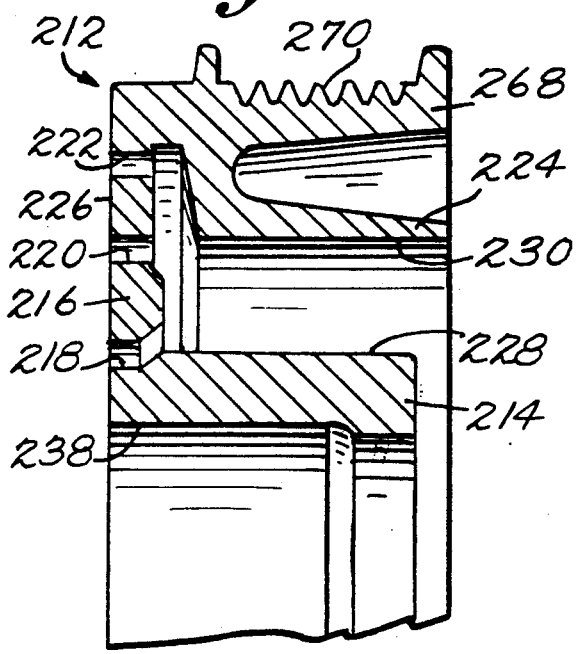
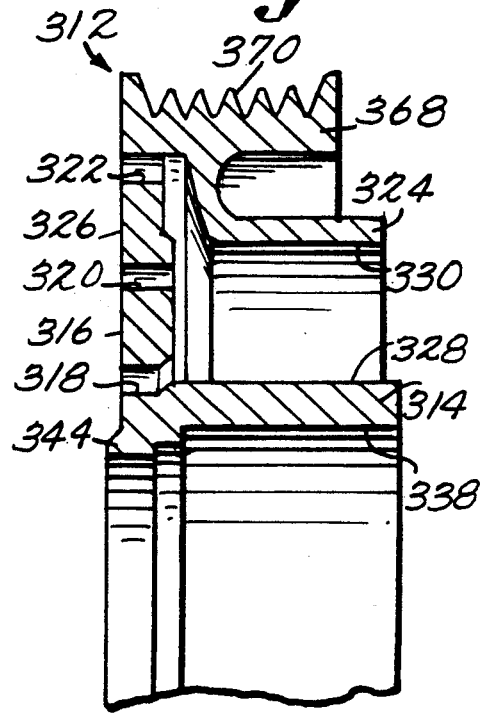
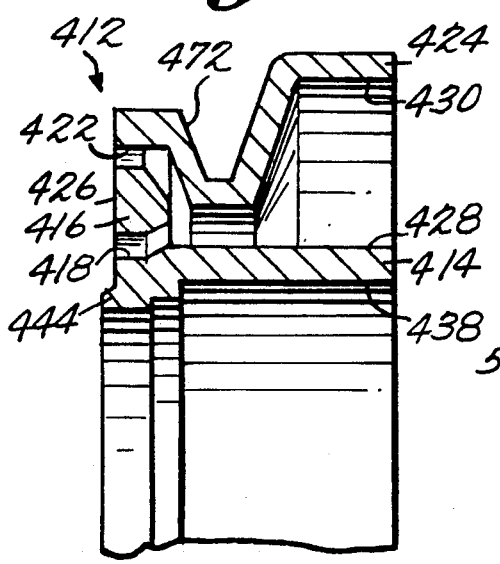
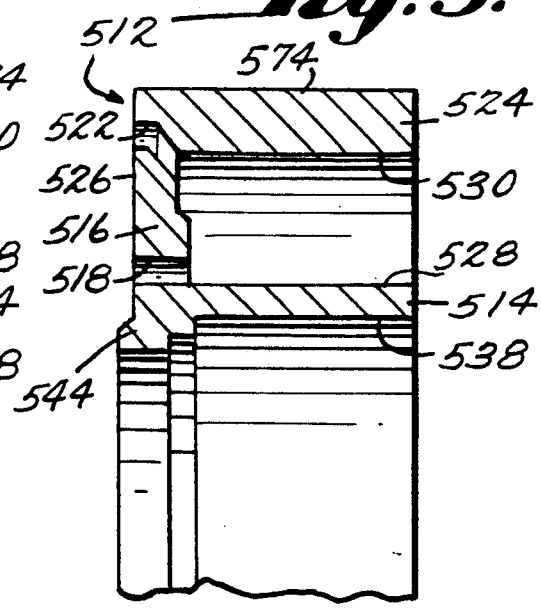

ELECTROMAGNETIC CLUTCH WITH IMPROVED ROTOR

This application constitutes a continuation-in-part of my copending application, Ser. No. 07/513,630, filed Apr. 24, 1990, now abandoned.

This invention relates to clutches and, more particularly, to improvements in electromagnetic clutches.

Electromagnetic clutches are well known and have been utilized commercially in automobiles for a number of years. A typical electromagnetic clutch includes a rotor which generally comprises an inner annular bearing portion, a clutch portion extending generally radially outwardly from one end of the inner portion, and an outer annular portion extending from the clutch portion in generally overlying spaced relation with respect to the inner portion. The spacing between the inner and outer annular portions receives the fixed electromagnetic coil therebetween which is energized to create the flux field in the rotor. The clutch portion includes a series of arcuate slots sometimes referred to as banana slots and cooperates with an armature plate which itself has cooperating arcuate slots therein. The purpose of the arcuate slots is to direct the flux field back and forth between the armature plate and clutch portion of the rotor which, in turn, is a measure of the efficiency of the magnetic attraction between the armature plate and the rotor.

Heretofore, the inner and outer series of arcuate slots in the rotor have been formed straight through the clutch portion. The present invention is based upon the principle that the torque-transmitting capability of a rotor can be increased by modifying the construction of the inner and outer series of arcuate slots from end to end so as to enable the magnetic flux path to be extended between the rotor and the armature plate to a greater inner extent along the inner areas of the crossing path and to a greater outer extent along the outer crossing path.

Accordingly, it is an object of the present invention to provide an electromagnetic clutch comprising a rotor rotatable about a rotational axis, an armature operable to be magnetically coupled with the rotor for rotation therewith and a fixed annular magnetic coil energizable to magnetically couple the rotor and armature. The rotor includes an inner annular portion, an annular clutch portion extending outwardly from an end of the inner annular portion and an outer annular portion extending from an outer end of the clutch portion. The annular clutch portion includes a rotor coupling surface and a series of arcuate slots extending from the coupling surface through the annular clutch portion. The armature includes an armature plate having an armature coupling surface for engaging the rotor coupling surface and a series of arcuate slots positioned in cooperating relation with respect to the series of arcuate slots of the rotor clutch portion so as to establish a magnetic flux path which passes back and forth between the rotor clutch portion and the armature plate a plurality of times. The inner and outer annular portions include opposed spaced annular surfaces for receiving the annular magnetic coil therebetween so that when the magnetic coil is energized a magnetic flux field is established within magnetic flux paths within the inner and outer annular rotor portions connecting with the magnetic flux path between the clutch portion and the armature plate. The series of arcuate slots includes a plurality of radially inner annularly spaced arcuate slots which extend through the annular clutch portion from a first position at the coupling surface side thereof to a second position at an opposite side thereof in which the second position is disposed radially outwardly of the first position.

Another object of the present invention is the provision of an electromagnetic clutch comprising a rotor rotatable about a rotational axis, an armature operable to be magnetically coupled with the rotor for rotation therewith and a fixed annular magnetic coil energizable to magnetically couple the rotor and armature. The rotor includes an inner annular portion, an annular clutch portion extending outwardly from an end of the inner annular portion and an outer annular portion extending from an outer end of the clutch portion. The annular clutch portion includes a rotor coupling surface and a series of arcuate slots extending from the coupling surface through the annular clutch portion. The armature includes an armature plate having an armature coupling surface for engaging the rotor coupling surface and a series of arcuate slots positioned in cooperating relation with respect to the series of arcuate slots of the rotor clutch portion so as to establish a magnetic flux path which passes back and forth between the rotor clutch portion and the armature plate a plurality of times. The inner and outer annular portions include opposed spaced annular surfaces for receiving the annular magnetic coil therebetween so that when the magnetic coil is energized a magnetic flux field is established within magnetic flux paths within the inner and outer annular rotor portions connecting with the magnetic flux path between the clutch portion and the armature plate. The series of arcuate slots includes a plurality of radially outer annularly spaced arcuate slots which extend in one direction inwardly from the coupling surface side of the annular clutch portion at a first position and extend outwardly to an opposite side of the annular clutch portion in a different direction at a second position spaced radially inwardly of the first position.

These and other objects of the present invention will become more apparent during the course of the following detailed description and appended claims.

The invention may best be understood with reference to the accompanying drawings wherein an illustrative embodiment is shown.

IN THE DRAWINGS:

FIG. 4 is an upper half vertical sectional view of a modified form of rotor constructed in accordance with the principles of the present invention;

FIG. 5 is a fragmentary righthand elevational view of the rotor shown in FIG. 4;

FIG. 6 is an view similar to FIG. 4 showing still another configuration of rotor constructed in accordance with the principles of the present invention;

FIG. 7 is a view similar to FIG. 4 showing still another form of rotor constructed in accordance with the principles of the present invention;

FIG. 8 is a view similar to FIG. 4 showing still another form of rotor constructed in accordance with the principles of the present invention; and FIG. 9 is a view similar to FIG. 4 showing still another form of rotor constructed in accordance with the present invention.

Figure 1:
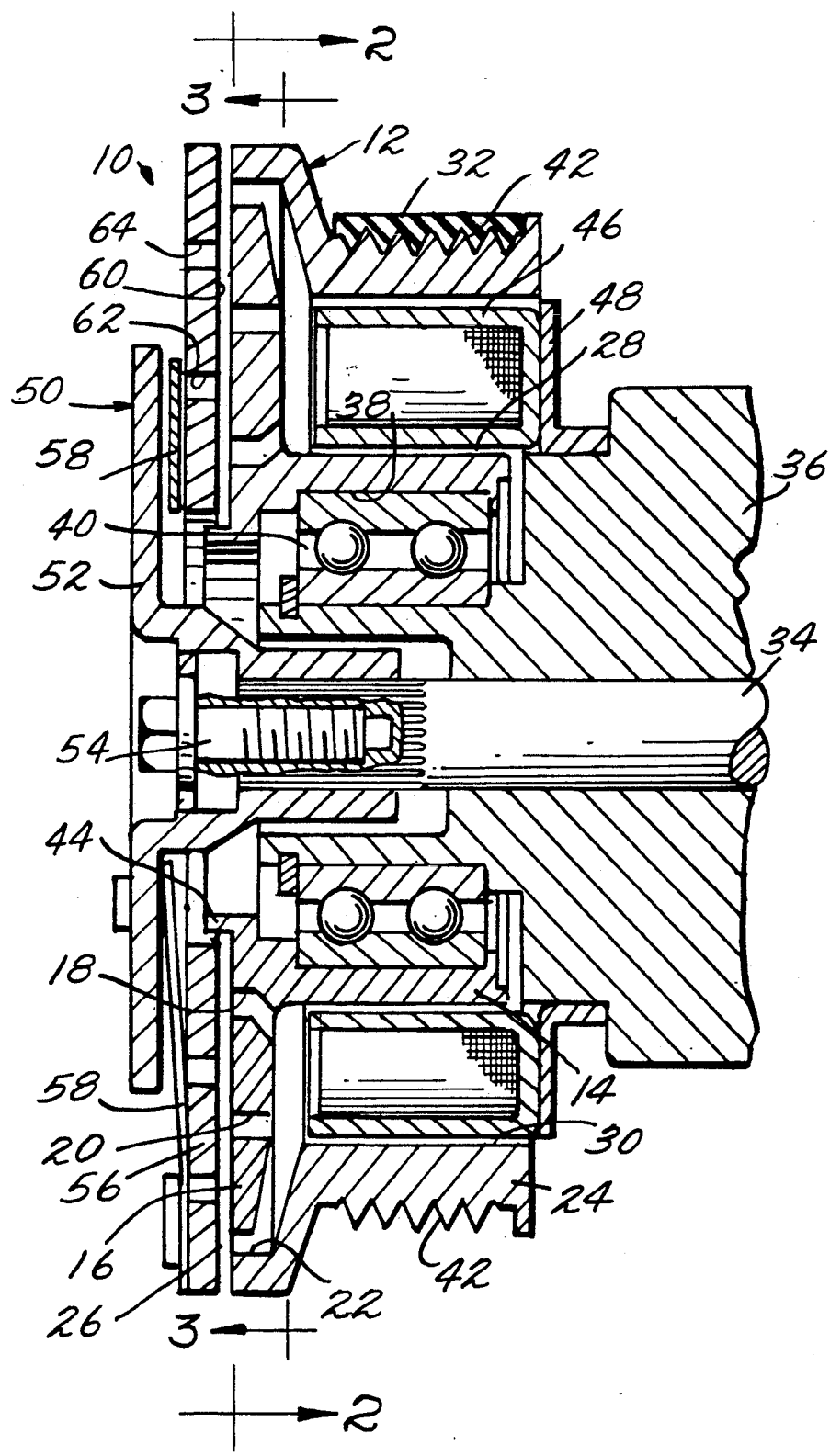
FIG. 1 is a vertical sectional view of an electromagnetic clutch constructed in accordance with the principles of the present invention.

Referring now more particularly to FIG. 1 of the drawings, there is shown therein an electromagnetic clutch, generally indicated at 10, which embodies the principles of the present invention. More specifically, the principles of the present invention are embodied in the configuration of a rotor, generally indicated at 12, and its cooperation with the other components of the clutch 10. It is preferred that the rotor 12 be made of ferritic cast iron in one piece in accordance with the method disclosed in my commonly assigned copending application Ser. No. 07/682,327, filed concurrently herewith since the constructions herein taught can be easily achieved in this manner. Accordingly, the disclosure of my aforesaid application is hereby incorporated by reference into the present specification. Nevertheless, in its broadest aspect, the present invention contemplates that the constructions can be achieved by other procedures utilizing other materials, as, for example, a two-piece welded steel construction or the like.

As shown in FIG. 1, the rotor 12 includes an inner annular portion 14, an annular clutch portion 16 extending outwardly from an end of the inner annular portion 14 and having a series of inner, intermediate, and outer arcuate slots 18, 20, and 22 extending therethrough and an outer annular portion 24 extending from an outer end of the annular clutch portion 16. The clutch portion 16 has a coupling surface 26 which performs a clutch-coupling function in operation. The inner and outer annular portions 14 and 24 have opposed annular surfaces 28 and 30, which perform a magnetic flux field receiving function.

In addition to the surfaces required for the flux carrying and clutch coupling functions, the rotor 12 must also interface with other structure which effects its rotational mounting and driving connection. In its simplest form, this interface may simply be a fixed connection with a driven or driving shaft. The rotor 12 shown in FIG. 1 is particularly configured for use in an electromagnetic clutch 10 connected to be driven by the serpentine belt 32 of an automotive serpentine accessory drive so as to selectively drive a compressor shaft 34 rotatably mounted within and extending outwardly from a compressor housing 36 of the compressor assembly of the accessory drive.

To this end, it will be noted that the inner portion 14 of the cast iron rotor 12 has an inner annular surface 38 finished so as to engage the outer race of a ball bearing assembly 40, the inner race of which is mounted on the fixed support provided by the compressor housing 36. The outer annular portion 24 of the rotor 12 has an outer poly-V surface configuration 42 so as to be drivingly engaged by the poly-V belt 32. As shown, the poly-V surface configuration 42 has an exterior diameter dimension less than the exterior diameter dimension of the clutch portion 16. In order to accommodate these diameter differences, the outer annular portion 24 is formed with an obtuse angular cross-sectional configuration so that it extends axially outwardly and radially inwardly from the outer end of the clutch portion 16 in coextensive relation therewith for a short distance and then axially outwardly in generally parallel relation with the inner portion 14.

As an added feature suitable for the particular application, the rotor 12 includes an annular grease guard portion 44. As shown, the grease guard portion 44 is disposed within the junction between the inner annular portion 14 and the clutch portion 16 and extends slightly axially therefrom.

As shown, the clutch 10 also includes an annular electromagnetic coil 46 which is fixed to the support provided by the compressor housing 36 by any suitable means such as bracket 48. The magnetic coil 46 is held in fixed relation within the space between the finished surfaces 28 and 30 of the rotor 12. The electromagnetic clutch 10 also includes an armature assembly, generally indicated at 50, which includes an annular mounting member 52 which is splined to the end of the compressor shaft 34 and fixedly secured thereon as by a bolt 54. The armature assembly 50 also includes an armature plate 56 which is connected with the armature mounting member 52 to rotate therewith and to have a limited amount of axial movement with respect thereto. This functional mounting of the armature plate 56 with the armature mounting member 52 is accomplished in the usual fashion by three resilient strap members 58 having opposite ends suitably pinned to the armature mounting member 52 and the armature plate 56.

In accordance with usual practice, the armature plate 56 includes a coupling surface 60 and a series of inner and outer arcuate slots 62 and 64 which are disposed in cooperating relation with respect to the series of arcuate slots 18, 20, and 22 in the rotor clutch portion 16 so that the magnetic flux generated by the magnetic coil 46 will be caused to flow in a flux path which extends between the clutch portion 16 and the armature plate 56 a plurality of times.

In accordance with the principles of the present invention, the end-to-end configuration of the inner and outer series of arcuate slots 18 and 22 are modified in a manner which enables the magnetic flux path to be extended between the rotor 12 and the armature plate 56 to a greater inner extent along the inner crossing path and to a greater outer extent along the outer crossing path which insures a greater torque-transmitting capability. To this end, the plurality of radially inner annularly spaced arcuate slots 18 extend through the annular clutch portion 16 from a first position at the coupling surface side thereof to a second position at an opposite side thereof in which the second position is disposed radially outwardly of the first position. Stated differently, the inner arcuate slots extend in one direction inwardly from the coupling surface side of the annular clutch portion 16 at a first position and extend outwardly to an opposite side of the annular clutch portion 16 in a different direction at a second portion spaced radially outwardly of the first position. Specifically, the one direction is a direction parallel with the rotational axis and the different direction is a direction which has a component parallel with the rotational axis and a radially outward component. Further, the plurality of radially outer annularly spaced arcuate slots 22 extend in one direction inwardly from the coupling surface side of the annular clutch portion 16 at a first position and extend outwardly to an opposite side of the annular clutch portion 16 in a different direction at a second position spaced radially inwardly of the first position. Specifically, the one direction is a direction parallel with the rotational axis and the different direction is a direction which has a component parallel with the rotational axis and a radially inward component.

When the electromagnetic coil 46 is energized, a magnetic field is established which creates a magnetic flux flow path from the magnetic coil 46 through the outer annular portion 24 of the rotor 12 past outer arcuate slots 22 and then onto the armature plate 56. Because of the outer slots 64 of the armature plate 56, the magnetic flux flows in a path back to the clutch portion 16 inwardly of the outer arcuate slots 22. The magnetic flux path continues until it reaches the intermediate arcuate slots 20 at which point it passes over to the armature plate 56 inwardly of the outer slots 64 therein. The inner slots 62 of the armature plate 56 cause the magnetic flux path to again cross over to the clutch portion 16 inwardly of the intermediate slots 20. Again, the inner arcuate slots 18 cause the magnetic flux path to again cross to the armature plate 56 below the inner slots 62. From the inner portion of the armature plate 56, the magnetic flux path is returned to the magnetic coil through clutch portion 16 and the inner portion 14. The manner in which the flux path is established between the rotor 12 and the armature plate 56 serves to move the armature plate axially so as to engage the armature coupling surface 10 with the rotor coupling surface 26. In this way, the rotary motion imparted to the rotor 12 by the serpentine belt 32 is transmitted to the compressor shaft 34.

The configuration of the outer annular portion 24 can be varied depending upon the type of drive mechanism which interfaces therewith. For example, in FIGS. 4 and 5 there is shown a modified rotor 112 which is constructed in accordance with the principles of the present invention. The construction of the rotor 112 includes portions corresponding to those of the previously described rotor 12 and corresponding reference numerals have been applied where the configuration does not vary by simply adding the prefix "1" to the reference numerals. In FIG. 4, the only change in configuration occurs in the exterior periphery of the axial extent of the outer annular portion 124. Thus, instead of the poly-V surface 42 previously provided, the exterior periphery of the end portion has a series of gear teeth 166 formed thereon. It will be understood that the gear teeth 166 could be formed on a separate annular member which is subsequently fixed to the remainder of the rotor.

Figure 2:
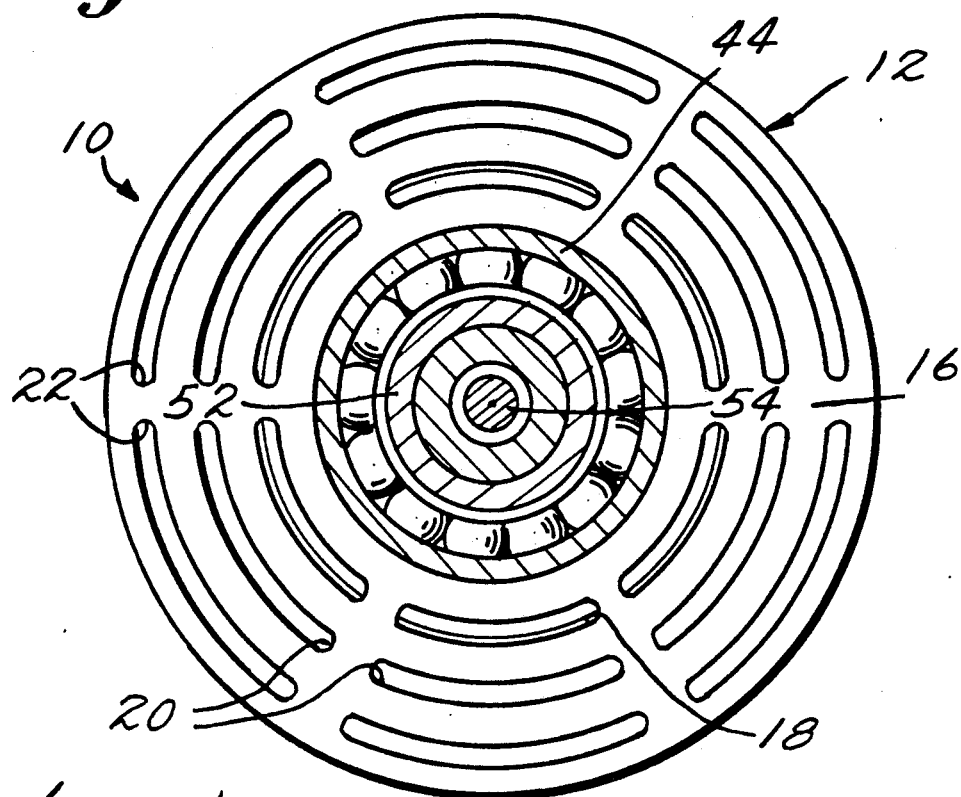
FIG. 2 is a sectional view taken along the line 2—2 of FIG. 1.
Figure 3:
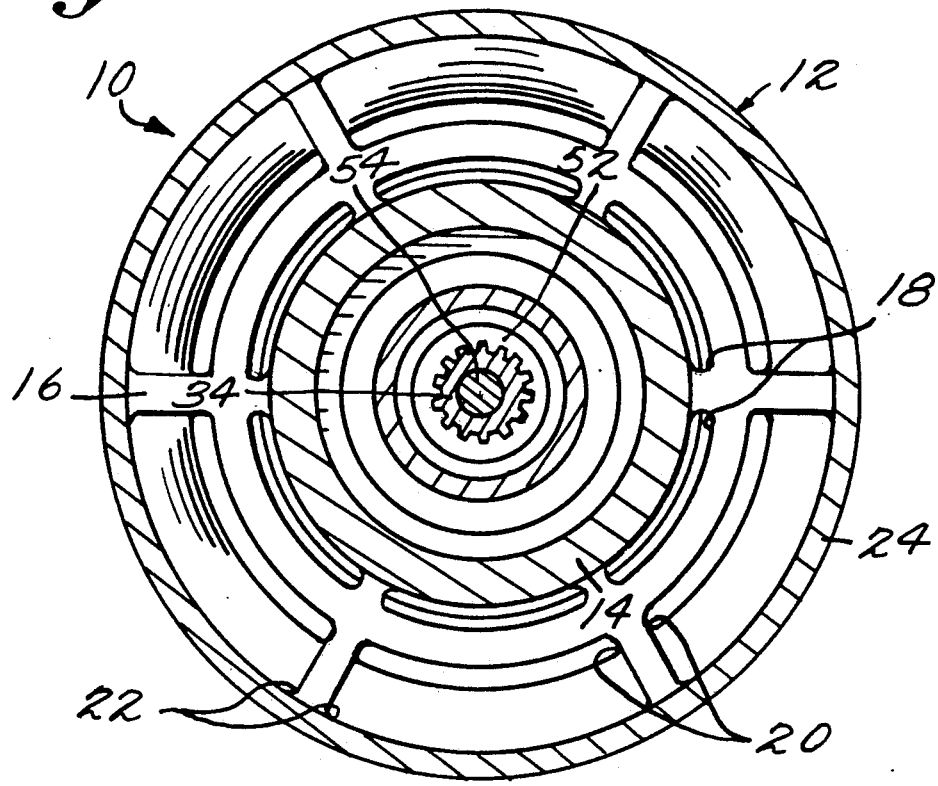
FIG. 3 is a sectional view taken along the line 3—3 of FIG. 1.

FIG. 6 illustrates still another embodiment of a rotor 212 to which reference numerals corresponding to those used in conjunction with the rotor 12 of FIGS. 1-3 with the prefix "2" have been applied. Here again, the major change in the construction of the rotor 212 is in the outer annular portion 224, although it will be noted that the upper series of arcuate slots 222 extend straight through. To accommodate the straight through configuration, the initial coextensive extent of the outer annular portion 224 is spaced from the clutch portion 216 a greater distance. In the embodiment of FIG. 6, the outer annular portion 224 includes an additional outer drive section 268 which is coextensive with the axial extent of the outer annular portion 224. As shown, the drive section 268 has its exterior periphery formed with poly-V groove surfaces 270 for cooperating with a poly-V belt. With this embodiment, a driving member of greater diameter than the one utilized in the embodiment of FIGS. 1-3 is provided. The embodiment of FIG. 6 illustrates the optional nature of the integral grease guard portion which has been eliminated from this embodiment.

FIG. 7 illustrates still another variation in the outer annular portion similar to the modification of FIG. 6. In this embodiment, in which corresponding reference numerals are given the prefix "3", the outer annular portion 324 is provided with an added drive section 368 which has a shorter axial dimension than the added drive section 268. To accommodate this lesser axial dimension, the poly-V groove surfaces 370 extend to the junction with the clutch portion 316. It will be understood that it is within the contemplation of the present invention to provide an added section on the opposite side of the added drive section 368 so as to provide ample axial extent to the exterior periphery within which to form the drive surfaces.

FIG. 8 discloses a rotor 412 in which corresponding reference numerals include the prefix "4". In this embodiment, the clutch portion 416 has a lesser axial extent than has been the case heretofore and the arcuate slots are of the four pole type with two fields so as to include only a plurality of inner annularly spaced arcuate slots 418 and a plurality of outer annularly spaced arcuate slots 422. In the embodiment shown in FIG. 8, the outer annular portion 424 is modified to cooperate with a V-belt. In this embodiment, the configuration of the outer annular portion 424 is such that it initially extends axially outwardly and radially inwardly from the clutch portion 416 in coextensive relation therewith for a short distance, then extends axially outwardly a short distance, then extends axially outwardly and radially outwardly to a greater diameter dimension, after which it extends axially outwardly in parallel relation with the inner annular portion 424. The end result of this configuration is to provide an exterior V-groove 472 for drivingly receiving a V-belt.

FIG. 9 illustrates still another variation in which corresponding reference numerals are given the prefix "5". In this embodiment, the clutch portion 516 is of the four pole type similar to the clutch portion 416 of FIG. 8. FIG. 9 illustrates an outer annular portion 524 which extends from the clutch portion 516 axially outwardly in parallel relation to the inner annular portion 514 throughout its extent. Nevertheless, as shown, the outer annularly spaced arcuate slots 52 have the angular end-to-end relationship previously described. The FIG. 9 embodiment also illustrates that the inner annularly spaced arcuate slots 518 may extend straight through. In the embodiment shown in FIG. 9, the exterior surface of the outer annular portion 524 is a simple cylindrical surface 574 which is adapted to engage the opposite flat side of a poly-V belt. Clearly, the exterior peripheral configuration shown in FIG. 9 could be modified to provide for a gear tooth such as shown in FIGS. 4-5, one or more V-belts such as shown in FIG. 8, or the poly-V groove surfaces as shown in FIGS. 1, 6, and 7.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:
1. An electromagnetic clutch comprising
a rotor rotatable about a rotational axis,
an armature operable to be magnetically coupled with said rotor for rotation therewith, and a fixed annular magnetic coil energizable to magnetically couple said rotor and armature, said rotor including an inner annular portion, an annular clutch portion extending outwardly from an end of said inner annular portion and an outer annular portion extending from an outer end of said clutch portion, said annular clutch portion including rotor coupling surface means and a series of arcuate slots extending from said coupling surface means through said annular clutch portion, said armature including an armature plate having armature coupling surface means for engaging said rotor coupling surface means and a series of arcuate slots positioned in cooperating relation with respect to the series of arcuate slots of said rotor clutch portion so as to establish a magnetic flux path which passes back and forth between said rotor clutch portion and said armature plate a plurality of times, said inner and outer annular portions including opposed spaced annular surface means for receiving said annular magnetic coil therebetween so that when said magnetic coil is energized a magnetic flux field is established within magnetic flux paths within said inner and outer annular rotor portions connecting with said magnetic flux path between said clutch portion and said armature plate, said series of arcuate slots including a plurality of radially inner annular spaced arcuate slots which extend through said annular clutch portion from a first position at the coupling surface means side thereof to a second position at an opposite side thereof in which said second position is disposed radially outwardly of said first position, the radially outermost extent of said inner arcuate slots at said first position being spaced radially from the opposed annular surface means of said inner annular portion a radial distance less than the radial distance between the radially outermost and radially innermost extent of said inner arcuate slots at said first position.

2. An electromagnetic clutch as defined in claim 1 wherein said plurality of radially inner annularly spaced arcuate slots extend from the coupling surface means side of said annular clutch portion at said first position generally in a direction parallel to said rotational axis and then extend to the opposite side of said annular clutch portion at said second position in a direction with a component which is parallel to said rotational axis and a radially outward component.

3. An electromagnetic clutch as defined in claim 2 wherein said series of arcuate slots includes a plurality of radially outer annular spaced arcuate slots which extend from the coupling surface means side of said annular clutch portion at a first position and extend to an opposite side of said annular clutch portion at a second position spaced radially inwardly of said first position, the radial innermost extent of said outer arcuate slots at said first position being radially outwardly of the opposed annular surface means of said outer annular portion.

4. An electromagnetic clutch as defined in claim 3 wherein said outer annular portion extends from the outer end of said clutch portion in an axially outward and radially inward direction in coextensive relation therewith for a short distance and then extends axially in parallel relation with said inner annular portion.

5. An electromagnetic clutch as defined in claim 4 wherein said rotor is a one-piece casting of cast iron.

6. An electromagnetic clutch as defined in claim 5 wherein said cast iron is ferritic ductile cast iron.

7. An electromagnetic clutch for an automotive air conditioner compressor having a fixed structure and a shaft extending therefrom rotatable about an axis comprising a rotor including an inner annular portion, an annular clutch portion extending outwardly from an end of said inner annular portion and an outer annular portion extending from an outer end of said clutch portion, said inner annular portion having an interior cylindrical surface, bearing means carried by the fixed structure and engaging said interior cylindrical surface for mounting said rotor for rotation about an axis coincident with the axis of the compressor shaft, said outer annular portion having an exterior annular drive surface configuration for drivingly cooperating with a driving element for effecting rotation of said rotor, said annular clutch portion including rotor coupling surface means and a series of arcuate slots extending from said coupling surface means through said annular clutch portion, an armature for drivingly connecting with the compressor shaft operable to be magnetically coupled with said rotor for rotation therewith to drive the compressor shaft, said armature including an armature plate having armature coupling surface means for engaging said rotor coupling surface means and a series of arcuate slots positioned in cooperating relation with respect to the series of arcuate slots of said rotor clutch portion so as to establish a magnetic flux path which passes back and forth between said rotor clutch portion and said armature plate a plurality of times, and a fixed annular magnetic coil for connection with the fixed structure of the compressor energizable to magnetically couple said rotor and armature, said inner and outer annular portions including opposed spaced annular surface means for receiving said annular magnetic coil therebetween so that when said magnetic coil is energized a magnetic flux field is established within magnetic flux paths within said inner and outer annular rotor portions connecting with said magnetic flux path between said clutch portion and said armature plate, said series of arcuate slots including a plurality of radially inner annular spaced arcuate slots which extend through said annular clutch portion from a first position at the coupling surface means side thereof to a second position at an opposite side thereof in which said second position is disposed radially outwardly of said first position, the radially outermost extent of said inner arcuate slots at said first position being spaced radially from the opposed annular surface means of said inner annular portion a radial distance less than the radial distance between the radially outermost and radially innermost extent of said inner arcuate slots at said first position.

8. An electromagnetic clutch as defined in claim 7 wherein said plurality of radially inner annularly spaced arcuate slots extend from the coupling surface means side of said annular clutch portion at said first position generally in a direction parallel to said rotational axis and then extend to the opposite side of said annular clutch portion at said second position in a direction with a component which is parallel to said rotational axis and a radially outward component.

9. An electromagnetic clutch as defined in claim 8 wherein said series of arcuate slots includes a plurality of radially outer annularly spaced arcuate slots which extend from the coupling surface means side of said annular clutch portion at a first position and extend to an opposite side of said annular clutch portion at a second position spaced radially inwardly of said first position, the radial innermost extent of said outer arcuate slots at said first position being radially outwardly of the opposed annular surface means of said outer annular portion.

10. An electromagnetic clutch as defined in claim 9 wherein said outer annular portion extends from the outer end of said clutch portion in an axially outward and radially inward direction in coextensive relation therewith for a short distance and then extends axially in parallel relation with said inner annular portion.

11. An electromagnetic clutch as defined in claim 10 wherein said exterior annular drive surface configuration is a poly-V configuration.

12. An electromagnetic clutch as defined in claim 11 wherein said poly-V configuration is formed on an annular section fixed to the initial extent of said outer annular portion and extending axially in generally parallel relation to the axial extent of said outer annular portion.

13. An electromagnetic clutch as defined in claim 10 wherein said exterior annular drive surface configuration is a series of gear teeth.

14. An electromagnetic clutch as defined in claim 10 wherein said rotor includes an integral grease-guard portion formed inwardly of the junction between said inner annular portion and said clutch portion and extending axially therefrom.

15. An electromagnetic clutch as defined in claim 10 wherein said rotor is a one-piece casting of cast iron.

16. An electromagnetic clutch as defined in claim 15 wherein said cast iron is ferritic ductile cast iron.

17. An electromagnetic clutch as defined in claim 7 wherein said exterior annular drive surface configuration is a poly-V configuration.

18. An electromagnetic clutch as defined in claim 7 wherein said rotor includes an integral grease-guard portion formed inwardly of the junction between said inner annular portion and said clutch portion and extending axially therefrom.

19. An electromagnetic clutch as defined in claim 7 wherein said rotor is a one-piece casting of cast iron.

20. An electromagnetic clutch as defined in claim 19 wherein said cast iron is ferritic ductile cast iron.

* * * * *